(12) United States Patent
Bonaventure et al.

(10) Patent No.: US 8,297,647 B2
(45) Date of Patent: Oct. 30, 2012

(54) BEARING MEMBER INCLUDING AN AIRBAG HOUSING

(75) Inventors: Franck Bonaventure, Belloy en France (FR); Michael Brunet, Therdonne (FR); Pierre Demortain, Paris (FR); Daniel Le Hoang, Chambly (FR)

(73) Assignee: Faurecia Interieur Industrie, Nanterre (FR)

( * ) Notice: Subject to any disclaimer, the term of this patent is extended or adjusted under 35 U.S.C. 154(b) by 84 days.

(21) Appl. No.: 12/864,342

(22) PCT Filed: Jan. 22, 2009

(86) PCT No.: PCT/FR2009/050089
§ 371 (c)(1), (2), (4) Date: Aug. 18, 2010

(87) PCT Pub. No.: WO2009/095589
PCT Pub. Date: Aug. 6, 2009

(65) Prior Publication Data
US 2010/0314858 A1 Dec. 16, 2010

(30) Foreign Application Priority Data
Jan. 29, 2008 (FR) ..................................... 08 50531

(51) Int. Cl.
*B60R 21/205* (2011.01)
*B60R 21/215* (2011.01)
(52) U.S. Cl. .................................. 280/728.2; 280/728.3
(58) Field of Classification Search ............... 280/728.2, 280/728.3
See application file for complete search history.

(56) References Cited

U.S. PATENT DOCUMENTS

| 5,435,593 | A | * | 7/1995 | Hiramitsu et al. | 280/728.2 |
| 5,484,165 | A | * | 1/1996 | Jenkins et al. | 280/728.2 |
| 5,887,891 | A | * | 3/1999 | Taquchi et al. | 280/728.2 |
| 5,904,367 | A | * | 5/1999 | Warnez et al. | 280/728.3 |
| 5,941,558 | A | * | 8/1999 | Labrie et al. | 280/728.3 |
| 6,502,851 | B2 | * | 1/2003 | Kitagawa | 280/728.2 |
| 7,121,577 | B2 | * | 10/2006 | Schenck et al. | 280/728.3 |
| 7,188,860 | B2 | * | 3/2007 | Hayashi | 280/728.2 |
| 7,798,517 | B2 | * | 9/2010 | Ishida | 280/728.2 |
| 7,828,323 | B1 | * | 11/2010 | Mazzocchi et al. | 280/732 |
| 2001/0040365 | A1 | | 11/2001 | Kitagawa | |
| 2004/0041379 | A1 | | 3/2004 | Hayashi | |

FOREIGN PATENT DOCUMENTS

DE 295 11 172 U1 2/1996

OTHER PUBLICATIONS

International Search Report, dated Jul. 28, 2009, from corresponding PCT application.

* cited by examiner

Primary Examiner — Drew Brown
(74) Attorney, Agent, or Firm — Young & Thompson

(57) ABSTRACT

A housing (4) for receiving an airbag is fixed to a support member (2) by at least one fixing element (18) which extends through a hole (20) of the member and which is fixed to the housing (4). The fixing element (18) is retained in the hole (20) with play so that the fixing element (18) is capable of pivoting, in a plane which contains the axis of the hole (20), inside the hole (20) under the action of the deformation of the housing (4) so as to absorb the deformation brought about by the deployment of the airbag.

20 Claims, 1 Drawing Sheet

BEARING MEMBER INCLUDING AN AIRBAG HOUSING

BACKGROUND OF THE INVENTION

1. Field of the Invention

Figure 1:
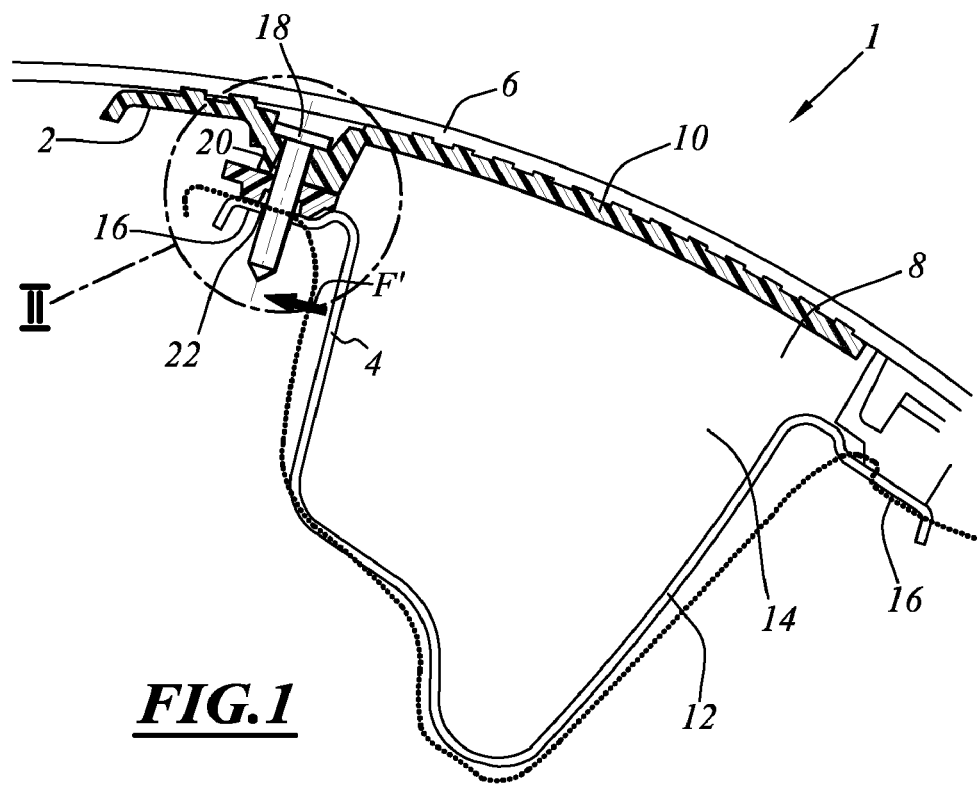

The present invention relates to a support member for a motor vehicle, of the type comprising a housing for receiving an airbag for a motor vehicle, the housing being fixed to the member by at least one fixing means which extends through a hole of the member and which is fixed to the housing.

The invention also relates to a dashboard panel comprising such a support member and a motor vehicle comprising such a dashboard.

2. Description of the Related Art

Motor vehicle dashboard panels generally comprise a housing for an airbag at the passenger side in order to protect the passenger in the event of an impact against the motor vehicle. The housing is fixed, for example, by means of screws, to a support member which forms the body of the dashboard panel around an opening which is formed in the support member in order to leave a passage for the airbag when it is deployed.

However, during the deployment of the airbag, the gas which allows the airbag to inflate increases in pressure inside the housing and tends to apply forces to the walls of the housing which become deformed under the action of these forces. These deformations affect the means for fixing the housing to the dashboard and place significant radial stress on the screws.

In this manner, the support member often breaks in the region of the fixing means, which can be dangerous for the passenger if pieces of dashboard panel are projected into the passenger space of the motor vehicle.

In order to overcome this disadvantage, there is provision to add means for fixing the housing to the support member in order to distribute the forces applied by the housing of the airbag and to reduce the stresses applied to each fixing means. According to another solution, the housing of the airbag is strengthened by the addition of reinforcement components which are fitted so that the housing is subject to less deformation during the deployment of the airbag.

However, such solutions are costly owing to the addition of fixing or reinforcement components and bring about a significant addition of mass to the dashboard panel, which is counter to the objectives of the motor industry to reduce the mass of a motor vehicle.

One of the objectives of the invention is to overcome these disadvantages by providing a support member of the above-mentioned type in which the deployment of the airbag does not place significant stresses on the fixing means of the housing, without the addition of fixing means or reinforcement members on the airbag housing.

SUMMARY OF THE INVENTION

To this end, the invention relates to a support member of the above-mentioned type in which the fixing means is retained in the hole with play so that the fixing means is capable of pivoting, in a plane which contains the axis of the hole, inside the hole under the action of the deformation of the housing so as to absorb the deformation brought about by the deployment of the airbag.

According to other features of the support member:
the hole of the member is substantially frustoconical, the housing being arranged at the side of the hole having the largest diameter;
the opening angle of the hole of the member is at least substantially 10°;
the housing comprises a fixing edge, the fixing edge comprising a hole which is arranged opposite the hole of the support member and through which the fixing means extends;
the fixing means is a screw which extends through the hole of the support member and which is screwed to the housing;
the fixing means comprises a head and a shank, the head being arranged at the side of the hole of the support member having the smallest diameter, the shank extending through the hole as far as the housing; and
the diameter of the shank of the fixing means is substantially equal to the smallest diameter of the hole of the support member.

The invention also relates to a dashboard panel comprising a support member as described above and a motor vehicle comprising such a dashboard panel.

BRIEF DESCRIPTION OF THE DRAWING FIGURES

Figure 2:
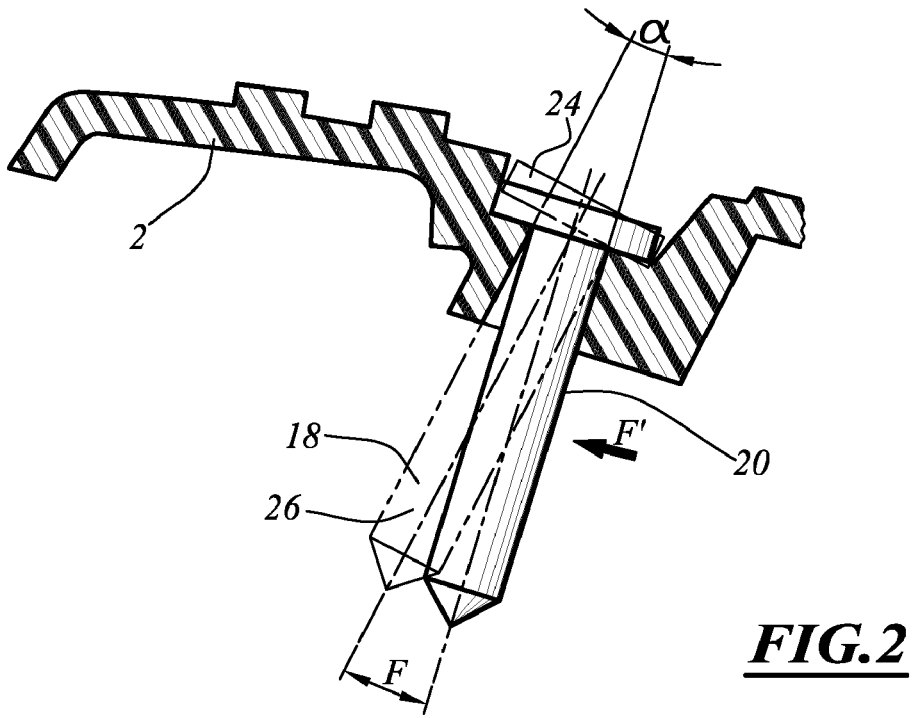

Other features and advantages of the invention will be appreciated from a reading of the following description, given purely by way of example and with reference to the appended drawings, in which:

FIG. 1 is a partial schematic section of a dashboard panel comprising a support member according to the invention, FIG. 2 is an enlarged schematic illustration of the zone II of FIG. 1.

DETAILED DESCRIPTION OF THE INVENTION

The description is given with reference to a dashboard panel, but it should be appreciated that the support member of the invention can be used for other components of a motor vehicle, such as a steering wheel or a trim panel for the passenger space of the motor vehicle.

With reference to FIG. 1, a dashboard panel 1 comprising a support member 2 and an airbag housing 4 is described.

In conventional manner, the support member 2 forms the body of the dashboard panel 1 and/or the charging channel of the airbag and is produced from a plastics material which provides the required strength for the panel 1. The support member 2 is covered with a surface layer 6 which comprises, for example, a layer of foam and a surface skin which covers the foam layer or quite simply a layer of hard plastics material.

The support member 2 comprises an opening 8 which allows the passage of an airbag during its deployment. This opening 8 is closed, for example, by means of a flap 10, which is fixed to the support member 2 and which can be pivoted relative to this member, whose movement is brought about by the deployment of the airbag and which tears the surface layer 6 in order to allow the deployment of the airbag in the passenger space of the motor vehicle.

The airbag housing 4 is fixed to the support member 2 at the periphery of the opening 8 of the member 2. The housing 4 extends at the other side of the support member 2 relative to the surface layer 6. The housing comprises at least one wall 12 in which there are accommodated the airbag and the gas generation device which allows it to be deployed (not illustrated). The housing comprises an opening 14 which is arranged opposite the opening 8 of the support member 2 in order to allow the passage of the airbag.

The wall 12 comprises a fixing edge 16 which extends substantially in the same plane as the opening 14 and which is arranged against the support member 2 on the periphery of the opening 8.

The housing 4 is fixed to the support member 2 by at least one fixing means 18 which extends through a hole 20 which is provided in the support member and which is fixed to the fixing edge 16 of the wall 12. The fixing means 18 is, for example, a screw which is screwed into a hole 22 provided in the fixing edge or a pin which extends through the hole 22 and retains the housing 4. The hole 22 is arranged opposite the hole 20, which extends through the support member 2 in the region of the opening 8 thereof. The fixing means 18 comprises a head 24 and a shank 26 which extends below the head 24. The head 24 is arranged at the other side of the hole 20 relative to the fixing edge 16 and the shank 26 extends through the hole 20 as far as the fixing edge 16.

As illustrated in FIG. 2, the hole 20 is substantially frustoconical, that is to say, the diameter of the cross-section thereof varies in a linear manner from one side to the other of the support member 2. The smallest diameter of the hole 20 is located at the side of the surface layer 6 and the head 24 of the fixing means 18, whilst the largest diameter of the hole 20 is located at the side of the housing 4 and the fixing edge 16 thereof. The diameter of the shank 26 of the fixing means 18 is substantially equal to the smallest diameter of the hole 20. According to an embodiment, the opening angle α of the hole 20, that is to say, the opening angle of the cone in which the hole 20 is defined is at least substantially 10°. According to an embodiment, this angle α may be greater than 5°.

Owing to the frustoconical shape of the hole 20, the fixing means 18 is arranged with play in the hole 20, as illustrated in FIG. 2 in which several positions of the fixing means 18 are illustrated. In particular, the fixing means 18 is capable of pivoting in a plane containing the axis of the hole 20 inside the hole 20, as illustrated by the arrow F of FIG. 2.

Such a fixing of the housing of the airbag 4 allows the deformation of the wall 12 of the housing to be absorbed during the deployment of the airbag and prevents this deformation from placing significant radial stresses on the support member 2. FIG. 1 illustrates with dotted lines the housing 4 deformed during the deployment of the airbag. As has been found and as illustrated by the arrow F', the deformation brings about a radial displacement of the wall 12. This displacement in accordance with the arrow F' brings about a pivoting of the fixing means 18 inside the hole 20, which has the effect of absorbing the deformation of the wall 12 without thereby affecting the support member 2.

The angle α is selected so that the pivoting of the fixing means 18 absorbs the majority of the movement of the wall 12 and the radial stresses applied to the support member 2 are not sufficient to break the support member 2 during the deployment of the airbag.

According to one embodiment, the support member 2 comprises at least two fixing means 18 and two holes 20 as described above. However, only one fixing means 18 is sufficient to absorb the deformation of the housing 4. The housing can be fixed by means of conventional screws at other points of the support member 2 or by means of adhesive-bonding or welding.

The support member 2 described above therefore allows the disadvantages involving the deformation of the housing 4 during deployment of the airbag to be overcome without the addition of supplementary fixing means, the fixing means 18 being able to replace a fixing screw which is conventionally used, or reinforcement means of the housing 2. In this manner, the invention allows the number of components to be reduced and enables savings to be made. Furthermore, since the fixing means 18 are, for example, produced from plastics material, there is no increase in mass on the motor vehicle.

The invention claimed is:

1. A support member (2) for a motor vehicle comprising a housing (4) for receiving an airbag for a motor vehicle, the housing (4) being fixed to the support member (2) by at least one fixing means (18) which extends through a hole (20) of the support member and which is fixed to the housing (4),
wherein the fixing means (18) is retained in the hole (20) with play so that the fixing means (18) is capable of pivoting, in a plane which contains an axis of the hole (20), inside the hole (20) under the action of the deformation of the housing (4) so as to absorb the deformation brought about by the deployment of the airbag, and
wherein the axis of the hole (20) extends substantially parallel to an axis of an opening (14) in the housing (4) through which the airbag deploys.

2. The support member according to claim 1, wherein the hole (20) of the support member (2) is substantially frustoconical, the housing (4) being arranged at the side of the hole (20) having the largest diameter.

3. The support member according to claim 2, wherein the opening angle (α) of the hole (20) of the support member (2) is at least substantially 10°.

4. The support member according to claim 1, wherein the housing (4) comprises a fixing edge (16), the fixing edge (16) comprising a hole (22) which is arranged opposite the hole (20) of the support member (2) and through which the fixing means (18) extends.

5. The support member according to claim 1, wherein the fixing means (18) is a screw which extends through the hole (20) of the support member (2) and which is screwed to the housing (4).

6. The support member according to claim 2, wherein the fixing means (18) comprises a head (24) and a shank (26), the head (24) being arranged at the side of the hole (20) of the support member (20) having the smallest diameter, the shank (26) extending through the hole (20) as far as the housing (4).

7. The support member according to claim 6, wherein the diameter of the shank (26) of the fixing means (18) is substantially equal to the smallest diameter of the hole (20) of the support member (2).

8. A motor vehicle dashboard panel comprising the support member (2) according to claim 1.

9. A motor vehicle comprising a dashboard panel (1) according to claim 8.

10. The support member according to claim 2, wherein the housing (4) comprises a fixing edge (16), the fixing edge (16) comprising a hole (22) which is arranged opposite the hole (20) of the support member (2) and through which the fixing means (18) extends.

11. The support member according to claim 2, wherein the fixing means (18) is a screw which extends through the hole (20) of the support member (2) and which is screwed to the housing (4).

12. The support member according to claim 3, wherein the fixing means (18) comprises a head (24) and a shank (26), the head (24) being arranged at the side of the hole (20) of the support member (20) having the smallest diameter, the shank (26) extending through the hole (20) as far as the housing (4).

13. The support member according to claim 10, wherein the fixing means (18) comprises a head (24) and a shank (26), the head (24) being arranged at the side of the hole (20) of the support member (20) having the smallest diameter, the shank (26) extending through the hole (20) as far as the housing (4).

14. The support member according to claim 11, wherein the fixing means (18) comprises a head (24) and a shank (26), the head (24) being arranged at the side of the hole (20) of the support member (20) having the smallest diameter, the shank (26) extending through the hole (20) as far as the housing (4).

15. The support member according to claim 3, wherein the housing (4) comprises a fixing edge (16), the fixing edge (16) comprising a hole (22) which is arranged opposite the hole (20) of the support member (2) and through which the fixing means (18) extends.

16. The support member according to claim 3, wherein the fixing means (18) is a screw which extends through the hole (20) of the support member (2) and which is screwed to the housing (4).

17. The support member according to claim 15, wherein the fixing means (18) comprises a head (24) and a shank (26), the head (24) being arranged at the side of the hole (20) of the support member (20) having the smallest diameter, the shank (26) extending through the hole (20) as far as the housing (4).

18. The support member according to claim 16, wherein the fixing means (18) comprises a head (24) and a shank (26), the head (24) being arranged at the side of the hole (20) of the support member (20) having the smallest diameter, the shank (26) extending through the hole (20) as far as the housing (4).

19. An apparatus for housing an airbag within a motor vehicle, the apparatus comprising:
- a support member (2); and
- a housing (4) for the airbag for the motor vehicle; and
- at least one fixing means to fix the housing (4) to the support member (2),
- wherein the fixing means extends through a hole (20) of the support member (2) and fixes to the housing (4),
- wherein the fixing means (18) is pivotable inside the hole (20) around the axis of the hole (20) upon a deformation of the housing (4) to absorb the deformation brought about by a deployment of the airbag, and
- wherein the fixing means is pivotable in a direction substantially perpendicular to a direction of deployment of the airbag.

20. The apparatus according to claim 19, wherein the hole (20) of the support member (2) is substantially frustoconical, the housing (4) being arranged at the side of the hole (20) having the largest diameter.

* * * * *